Patented June 17, 1952

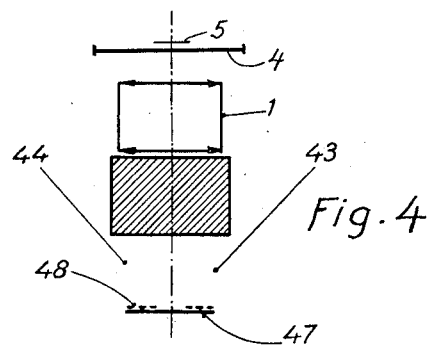
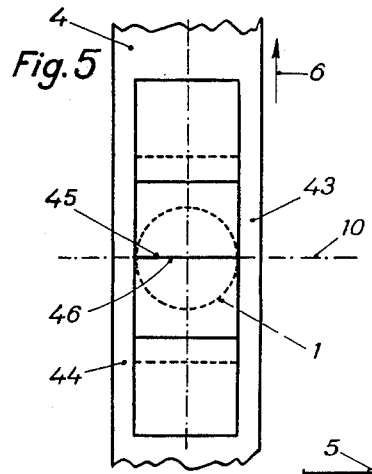
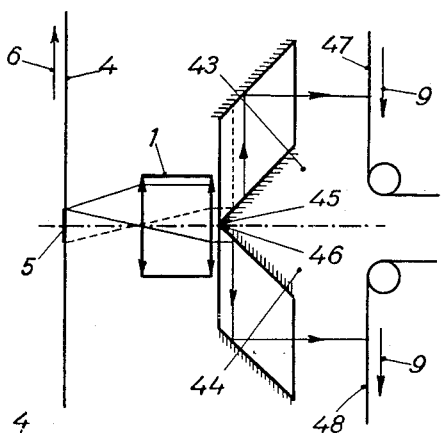
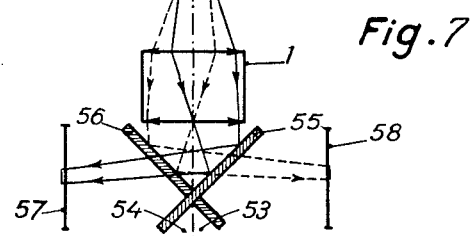
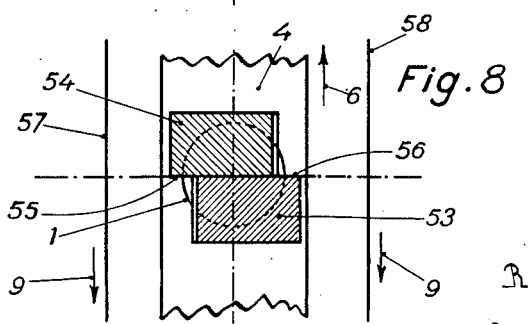

2,600,489

UNITED STATES PATENT OFFICE 2,600,489

APPARATUS FOR MULTIPLE COPYING OF CINEMATOGRAPHICAL FILMS

Raymond Fernand Adrien Valentin d'Avitaya, Marseille, France

Application November 17, 1948, Serial No. 60,472
In France November 24, 1947

4 Claims. (Cl. 88—24)

This invention relates to an apparatus for printing motion picture films particularly sound records thereof, and more specifically to an apparatus of that type wherein a negative, that is an exposed and developed film is copied on two positive or raw films in a single machine.

It is an object of this invention to provide an apparatus for multiple copying of motion picture films which comprises means to continuously displace at a uniform speed the film to be copied across the intake end of a single objective, means to split the pencil of light beams incoming through this objective into two halves by two conjugated light deflecting optical members having their bases facing the outlet end of the objective separated from each other by the axial plane of the objective perpendicular to the direction of displacement of the said film and said splitting means deflecting each half of the pencil of light beams by its respective optical member onto one of two positive films and means to displace the two positive films continuously at a uniform speed in a direction opposite to the direction of displacement of the negative film.

In order that the invention may be more clearly understood and readily carried into effect, the same will now be described with reference to the accompanying diagrammatic drawings in which the film images to be copied are constituted, for example, by a continuous sound record.

In the drawing

Figs. 4, 5 and 6 are plan, elevational rear and lateral views, respectively, of another embodiment of the apparatus according to my present invention; and Figs. 7 and 8 show yet a further embodiment of my new apparatus in a plan view and elevational view, respectively.

In all figures of the drawings the same elements are designated by the same reference numbers.

Figure 1:
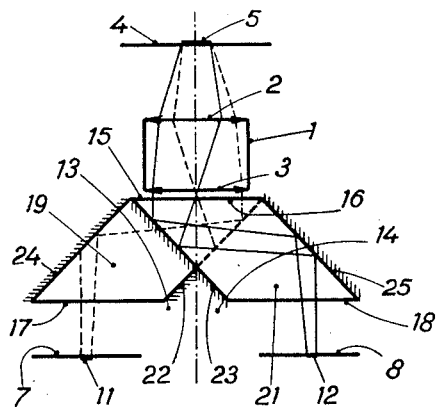
Fig. 1 is a plan view of an embodiment of the apparatus according to my invention.
Figure 2:
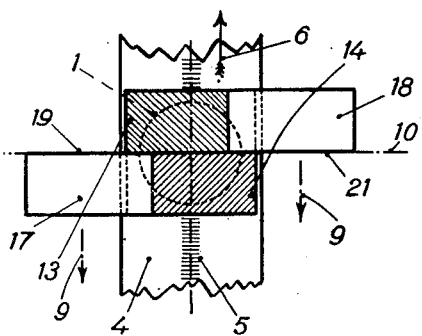
Fig. 2 is an elevational view corresponding to Fig. 1.

In Figs. 1 and 2 the reference 1 designates an objective with inlet and outlet lenses 2 and 3 respectively. The exposed and developed film 4 with its sound record 5 to be reproduced is displaced across the objective 1 continuously at a uniform speed, in the upward direction indicated by the arrow 6 in Fig. 2.

The pencil of rays after passing through the film 4 traverses the two lenses of the objective 1 and is thereafter split into two halves by an optical system described hereafter by which two images 11 and 12 are reproduced on two raw films 7 and 8, respectively. These two raw films 7 and 8 are longitudinally driven at the same uniform speed as the negative film 4 in a direction opposite to the direction of displacement of the film 4 as indicated by arrows 9 in Fig. 2.

The optical system mentioned above for splitting and deflecting the pencil of rays leaving the objective comprises two conjugated double-reflection prisms 13 and 14, which overlap each other to bring their inlet faces or bases 15 and 16 opposite and close to the outlet lens 3 of the objective 1 and which contact each other with their side faces 19 and 21 in a horizontal diametral plane 10 (Fig. 2) of objective 1 and perpendicular to the direction 6 of displacement of the film 4.

The inlet faces or bases 15 and 16 of said prisms 13 and 14 as well as their outlet faces or bases 17 and 18 are perpendicular to the optical axis of the objective 1. The width of the rectangular inlet faces or bases 15 and 16 of said prisms is so selected that each of them will receive the light rays incoming from one half of the lens 3 as illustrated in Fig. 2. The outlet faces or bases 17 and 18 of said prisms are equal and parallel to the bases 15 and 16, respectively. The reflecting faces 22 and 23, 24 and 25 are in the shown embodiment symmetrical at 45° with respect to the vertical diametral plane of the objective and parallel to the direction of displacement 6. In Fig. 2 the raw films 7 and 8 are omitted for the sake of better clarity.

Figure 3:
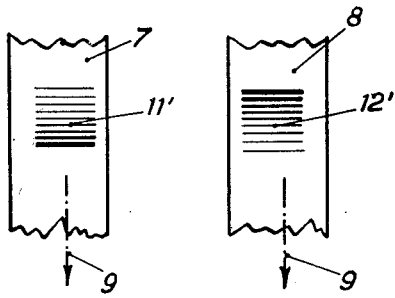
Fig. 3 shows top views on an enlarged scale of segments of a sound record simultaneously copied upon two raw films.

Fig. 3 shows diagrammatically in an enlarged scale an example of images 11' and 12' imparted at a given instant to the raw films 7 and 8, respectively, it being assumed that the original image to be copied is a portion of a record on film 4 constituted by lines uniform with regard to their intensity, width and spacing. As each momentary image upon the positive films 7, 8 is formed by a semicircular half of the pencil of rays leaving the objective 1 each momentary image 11' and 12' will be composed of lines showing increasing or decreasing intensity, respectively, in the direction of arrow 9 indicating the direction of displacement of the positive films 7 and 8. However, as the illumination of superposed zones of the negative and the two positive films varies while the films are moved during the copying operation each positive film will receive the same amount of light and an accurate reproduction will be obtained.

In the embodiment shown in Figs. 4, 5 and 6 the prisms 43 and 44 have their common edges 45 and 46 arranged in the axial plane of symmetry 10 perpendicular to the direction of displacement 6 of the negative film 4 to be copied, and the raw films 47 and 48 are displaced in the direction 9 which is parallel with, but opposite to the direction 6 in which the negative film is moved.

In the embodiment shown in Figs. 7 and 8 the prisms 13 and 14 of Figs. 1 and 2 are replaced by mirror 53 and 54 which cross each other side by side and are symmetrically inclined with regard to the axial plane parallel to the direction of displacement 6 of the negative film 4. The lateral faces 55 and 56 of said mirrors cross each other in an axial plane perpendicular to the axial plane mentioned before. Thus the mirror 54 will deflect one half of the pencil of rays onto the raw film 57, which is conveniently disposed laterally and displaced in the direction of arrow 9 while the mirror 53 will deflect the other half of the pencil of rays onto the raw film 58 arranged symmetrically to film 57.

It will be understood that changes may be made in the particular light splitting and deflecting means described and shown, without substantially departing from the spirit of the invention.

Thus, there may be used single or multiple reflecting prisms, or appropriate mirrors, or else any suitable combination thereof.

While specific embodiments of my invention have been shown and described in detail to illustrate the application of the principles of my invention it will be well understood that the same may be otherwise embodied without departing from such principles as defined in the appended claims.

What I claim as my invention is:

1. In an apparatus for simultaneously and continuously copying a negative film, more particularly its sound record, upon two virgin films, the combination comprising means for continuously driving said negative film and said two virgin films at uniform and equal speeds, an objective receiving the pencil of rays passing through the negative film, and two conjugated light deflecting optical members bisecting said pencil of rays beyond said objective perpendicularly to the direction of motion of said negative film in two divisional pencils of rays and focusing each divisional pencil of rays upon one of said two virgin films.

2. An apparatus for simultaneously and continuously copying a negative film as claimed in claim 1, wherein the two conjugated light reflecting optical members comprise two symmetrically arranged double-reflection prisms, their inlet faces being situated in neighbouring positions close to the outlet of the objective in a common plane perpendicular to the axis of the objective and having a common base edge located in a plane passing through the axis of the objective perpendicularly to the direction of motion of said negative film, the outlet faces of said prisms each facing one of the two virgin films.

3. An apparatus for simultaneously and continuously copying a negative film as claimed in claim 1, wherein the two conjugated light reflecting optical members comprise two adjacent mirrors in crossing position, each mirror being located on one side of a plane passing through the axis of the objective perpendicularly to the direction of motion of the negative film, the crossing axis of said mirrors being situated in a plane passing through the axis of the objective parallel to the direction of motion of the negative film, and the reflecting surface of each mirror facing one of the two virgin films.

4. In an apparatus for simultaneously and continuously copying a negative film, more particularly its sound record, upon two virgin films, the combination comprising means for continuously driving said negative film and said two virgin films at uniform and equal speeds, an objective receiving the pencil of rays passing through the negative film, and two adjacent double reflecting rhomboidal prisms of opposite disposition to each other, said prisms contacting each other sidewise in a plane passing through the optical axis of the objective perpendicularly to the direction of motion of said negative film and overlapping each other to have their inlet faces opposite and close to the outlet of said objective, the outlet face of each of said prisms facing one of the two virgin films.

RAYMOND FERNAND ADRIEN
VALENTIN D'AVITAYA.

REFERENCES CITED

The following references are of record in the file of this patent:

UNITED STATES PATENTS

| Number | Name | Date |
| --- | --- | --- |
| 862,354 | Stevens | Aug. 6, 1907 |
| 1,299,431 | Dawson | Apr. 8, 1919 |
| 1,705,760 | Griffith | Mar. 19, 1929 |
| 1,836,038 | Owens | Dec. 15, 1931 |
| 1,969,465 | Jones | Aug. 7, 1934 |
| 2,001,005 | Whitaker | May 14, 1935 |
| 2,058,415 | Chretien | Oct. 27, 1936 |
| 2,168,273 | Sauer | Aug. 1, 1939 |